Nov. 11, 1958  R. WESTBURY  2,859,926
AIRCRAFT
Filed Nov. 29, 1955  3 Sheets-Sheet 1
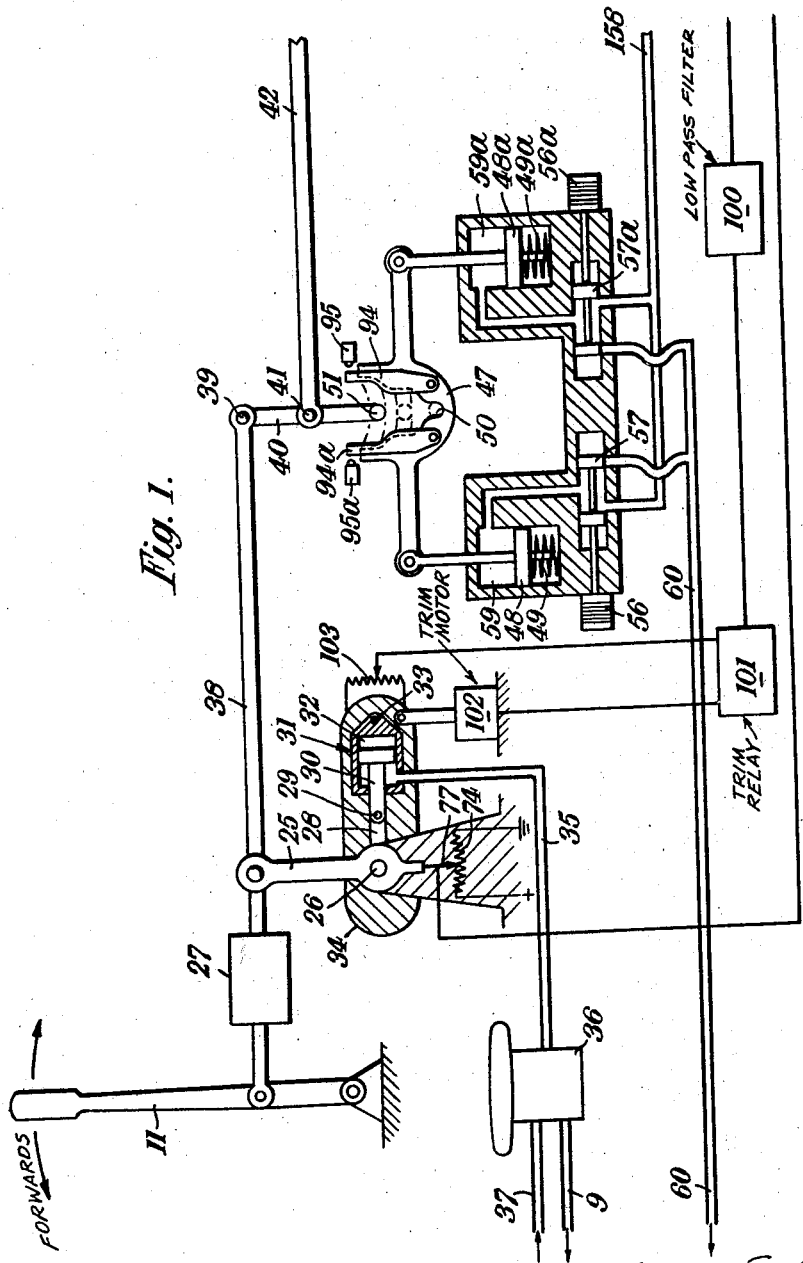

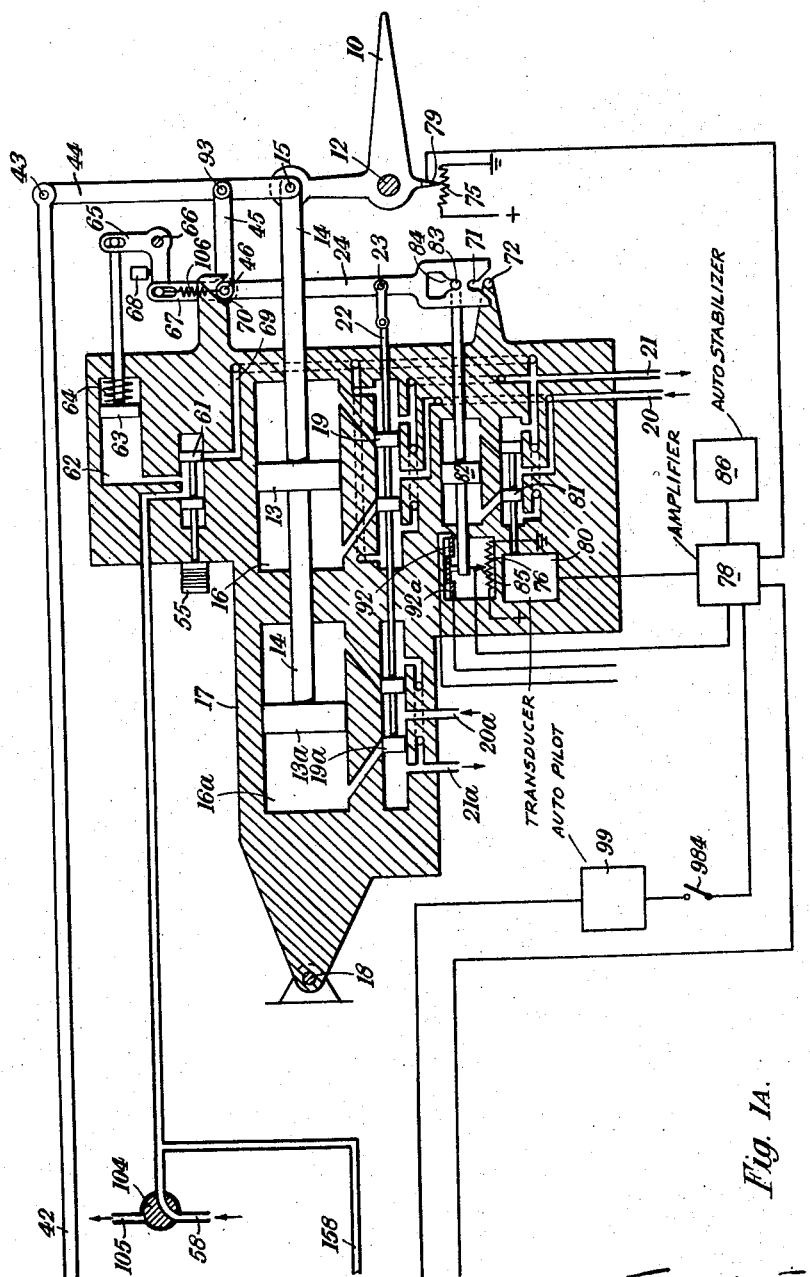
Fig. IA.

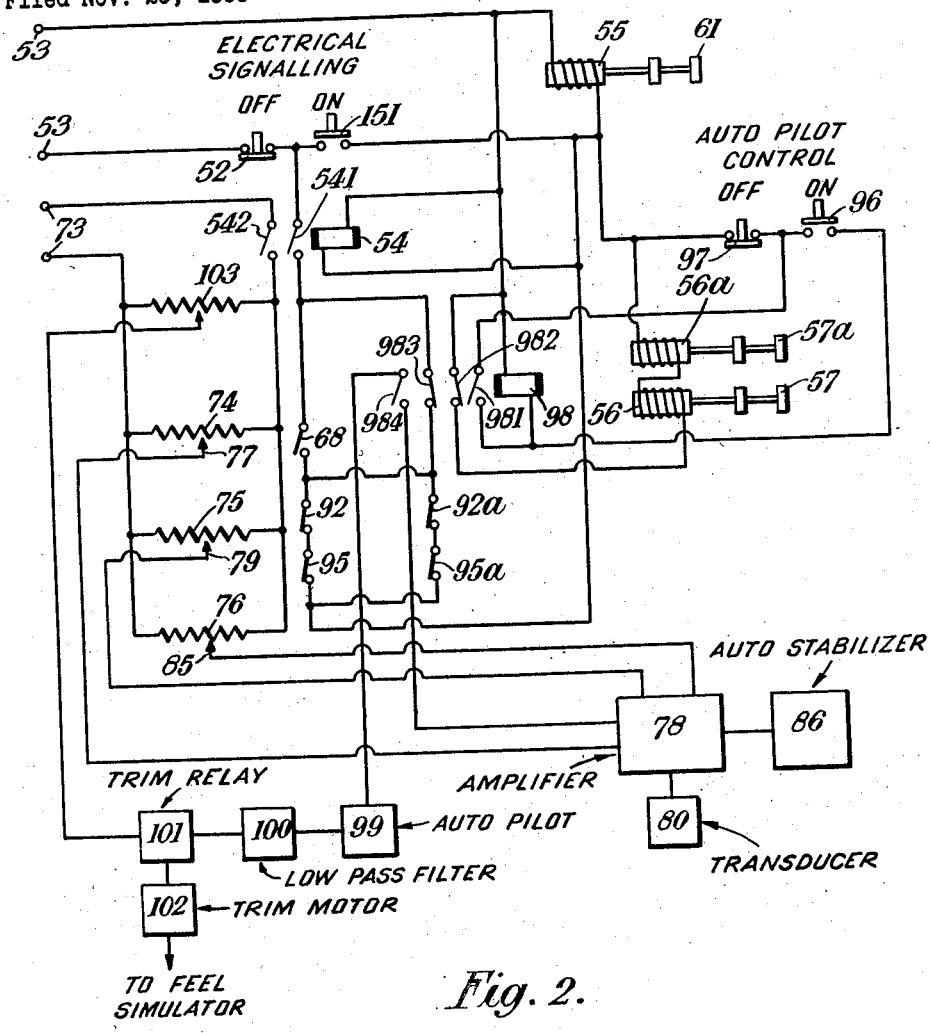
Fig. 2.
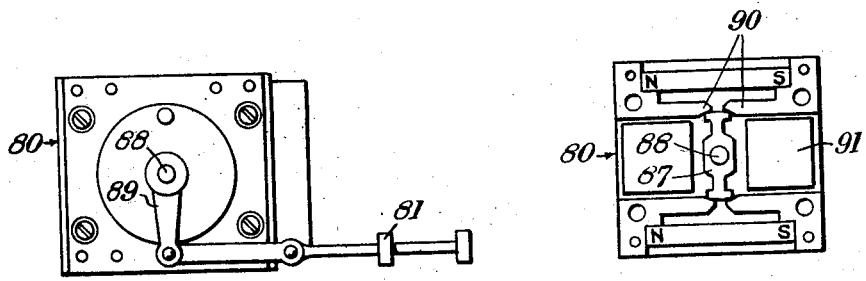
Fig. 3.
Fig. 4.
Inventor
Roy Westbury
By Moses, Nolte and Nolte
Attorneys United States Patent Office
2,859,926
Patented Nov. 11, 1958

2,859,926
AIRCRAFT

Roy Westbury, Bridgnorth, Salop, England, assignor to H. M. Hobson Limited, London, England, a British company Application November 29, 1955, Serial No. 549,737

Claims priority, application Great Britain December 3, 1954

10 Claims. (Cl. 244—76)

This invention relates to power operated flying control systems for aircraft. In modern aircraft it is necessary to provide for actuation of the control surfaces not only by the pilot but also by the auto-pilot, when the latter is switched on. In high speed flight at altitude the aircraft tends to oscillate, particularly in yaw, from the desired course and an auto-stabilizer is usually provided for the purpose of damping out these oscillations.

It is accordingly convenient to employ for the actuation of each control surface a hydraulic servo motor, disposed near the control surface and operable by an electro-hydraulic actuator, to which electric signals are applied either as the result of manual movement of a pilot's control member, or automatically, when the system is under automatic pilot control, to adjust the position of the control surface.

It is, however, desirable to provide a standby mechanical linkage for use in operating the servo motor in the event of an electrical failure, the pilot's operating member being normally uncoupled from the linkage and means being provided whereby, in the event of an undue discrepancy between the positions of the operating lever and the control surface, a lock can be engaged to couple the operating member to the linkage and the electrical signalling system can be rendered inoperative on the servo motor. However, it is undesirable that these results should ensue as the result of the discrepancy arising from the servo motor being unable to move the control surface to the position called for by the pilot's action, either due to the servo motor being unable to develop sufficient force to overcome the control surface hinge moment or due to the servo motor becoming velocity saturated, i. e. being unable to execute with sufficient speed the movement demanded by the pilot's action.

The invention accordingly provides, in an aircraft, a power operated flying control system comprising a hydraulic servo motor, for actuating a control surface of the aircraft, which is operable by an electro-hydraulic actuator under control of an electrical signalling system and also by a mechanical linkage to move the control surface to positions selected by a pilot's control member, said linkage being uncoupled from the control member when the electric signalling system is in operation, a lock for coupling the control member to the linkage, a first switch mechanism which is differentially operable by relative movement in opposite directions of the control member and the linkage, a second switch mechanism which is differentially operable by movement in opposite directions of the output member of the electro-hydraulic actuator, and changeover mechanism operable by said switch mechanisms in the event of runaway of the actuator but not as the result of insufficient movement of the control surface in the direction selected by the pilot, to engage the lock and to disable the electrical signalling system, thereby giving the pilot mechanical control over the servo motor through the linkage.

The arrangement may be such that, in the event of failure of the electrical signal, the first switch mechanism is operated as the result of movement by the pilot of his control member in an instinctive attempt to counteract the resultant runaway of the electro-hydraulic actuator. Alternatively, the mechanical linkage may be arranged to move in unison with the control surface and to actuate the first switch mechanism automatically when the positions of the control surface and the control member are sufficiently discrepant. In either case, actuation of the first switch mechanism will not be effective to cause operation of the changeover mechanism when the control surface is unable to move sufficiently in the direction selected by the pilot.

Preferably the system includes an auto pilot which can be switched in to assume control over the electro-hydraulic actuator and means responsive to switching in of the auto pilot for engaging the lock. Accordingly, when the auto pilot is in operation, the pilot's control member will be moved by the linkage to positions corresponding to those assumed by the control surface.

One embodiment of the invention will now be described in detail, by way of example, with reference to the accompanying drawings in which:

Figs. 1 and 1A collectively constitute a diagram of the complete flying control system, showing the parts in the positions they occupy when the control surface is under electrical control.

Fig. 2 is a circuit diagram.

Fig. 3 is a front elevation of the electro-mechanical transducer and

Fig. 4 is a similar view, showing the cover plate of the transducer removed.

Like reference numerals indicate like parts throughout the figures.

Figs. 1 and 1A show the mechanism for actuating one control surface 10 of the aircraft, which may be assumed to be the elevator, under control of the pilot's control member 11 (Fig. 1). It will be understood that similar mechanism is employed for actuating the ailerons and rudder.

The elevator 10 (Fig. 1A) is pivoted at 12 and actuated by a hydraulic servo motor comprising two jack pistons 13, 13a in tandem. The pistons are mounted on a common rod 14 pivoted at 15 to the control surface 10 and also to a lever 44. The jack pistons are accommodated in cylinders 16, 16a in a cylinder block 17 pivoted at 18 to the aircraft structure. Associated with the cylinders 16, 16a are control valves 19, 19a, which constitute the input member of the servo motor and control the admission to the cylinders of liquid under pressure from separate sources connected to inlets 20, 20a respectively. Exhaust outlets 21, 21a are associated with the two jack cylinders. The control valves 19, 19a are mounted on a common rod 22, pivoted at 23 to a differential link 24. As will be readily seen, movement of the control valves from the neutral position shown will cause the jack pistons 13, 13a to move in the reverse direction to actuate the elevator 10.

The pilot's control member 11 is connected to a lever 25, pivoted at 26, by a linkage 38 incorporating non-linear gearing 27 of the kind described in U. S. application No. 510,931, filed May 25, 1955. The lever 25 carries an arm 28 pivoted at 29 to the piston rod 30 of hydraulic feel simulator jack 31. The cylinder 32 of the jack is pivoted at 33 to a plate 34 mounted for rocking movement on the pivot 26. The jack cylinder 32 is connected by a signal line 35 to a control unit 36 which operates as described in U. S. application No. 407,536, filed February 1, 1954, now Patent No. 2,783,006, February 26, 1957, to establish alternative connection of the signal line 35 to a pressure line 37 and to an exhaust line 9 so as to establish in the jack cylinder 32 a hydraulic pressure which increases with airspeed. The feel imparted to the control member 11 accordingly increases with airspeed and the non-linear gearing 27 operates, as described in U. S. application No. 510,931, to vary as a function of airspeed the travel of the control member required to produce unit displacement of the control surface. The linkage 38 is pivoted at 39 to link 40, pivoted at 41 to a control rod 42. The control rod 42 is pivoted at 43 to the lever 44 which is connected at 93 to a link 45 pivoted to the upper end 46 of the differential link 24.

Associated with the link 40 is a backlash lock 47. Pistons 48, 48a loaded by springs 49, 49a seek to raise the lock 47 to engage a notch 50 in the lock with the lower end 51 of the link 40, so eliminating backlash between the control member 11 and the control rod 42. When, however, the system is organised for operation of the servo motor under control of electrical signals from the control member 11, as shown, the lock 47 is disengaged and the control member 11 is uncoupled from the control rod 42.

Turning now to Fig. 2, it will be seen that the pilot is provided with an on switch 151, actuation of which selects electrical signalling and, with an off switch 52, actuation of which disengages electrical signalling. On actuation of the switch 151, current is supplied from supply terminals 53 to a relay 54 and to solenoids 55, 56 and 56a. Operation of the relay 54 closes a switch 541 to maintain a holding circuit for the relay 54 and for the three solenoids. Energization of the solenoids 56, 56a causes associated valves 57, 57a to move to the position shown in Fig. 1, thereby admitting liquid under pressure from an inlet 58 along a line 158 to cylinders 59, 59a housing the pistons 48, 48a, thereby depressing the pistons against their springs and moving the lock 47 to the disengaged position as shown. When the solenoids 56, 56a are de-energized, the valves 57, 57a move to their alternative positions in which they connect the cylinders 59, 59a to an exhaust line 60, so allowing the pistons 48 to engage the lock 47.

Energization of the solenoid 55 moves an associated valve 61 to the position shown in Fig. 1A, thereby admitting pressure from the inlet 58 to a cylinder 62 and moving the piston 63 to the right against a spring 64 as shown. This causes a bell crank 65, pivoted at 66, to rock clockwise and thereby, through a spring 106, to lift the differential link 24 to the position shown, in which its upper end abuts against a fixed fulcrum 70 on the cylinder block 17. Movement of the bell crank to the position shown closes an auto-pilot hold-in switch 68, shown also in Fig. 2. When the solenoid 55 is de-energized, the valve 61 is moved to connect the cylinder 62 to a line 69 connected to the exhaust outlet 21, thereby allowing the spring 64 to rock the bell crank 65 counter-clockwise to open the switch 68 and, through a link 67, to lower the differential link 24 to a position in which its upper end 46 is free and a notch 71 at its lower end engages a fixed fulcrum pin 72 on the cylinder block 17.

Energization of the relay 54 also closes a switch 542, Fig. 2, thereby connecting to supply terminals 73, three potentiometers 74, 75, 76.

When, as the result of closure of the switch 151, manual control with electrical signalling is selected, the pilot's control member 11, subject to hydraulic feel, is free to move within the confines of the lost motion provided at the backlash lock, to rock the lever 25 about its pivot 26. A pick off 77 attached to the lever 25 coacts with the potentiometer 74 to send an electrical signal to a magnetic amplifier 78. The magnetic amplifier is a device using saturable reactors to secure amplification. Such devices are described in the text book "Magnetic Amplifiers," by H. F. Storm, published by John Wiley & Sons Inc., New York, 1955. The control surface 10 carries a pick off 79 coacting with the potentiometer 75. The amplifier compares the signals from the potentiometers 74, 75 which are respectively representative of the positions of the control member and the control surface and, in the event of discrepancy between these positions, transmits an appropriate signal to an electro-mechanical transducer 80 coupled to the control valve 81 of a first stage servo motor. This first stage servo motor is thus an electro-hydraulic actuator, the input member of which is constituted by the control valve 81. As will be apparent, movement of the relay valve 81 from the neutral position shown will cause the associated first stage ram 82 (which constitutes the output member of the hydraulic actuator) to move in the reverse direction. A pin 83, engaging the base of a V-shaped slot 84 in the differential link 24, then rocks the link about its upper end 46 to displace the control valves 19, 19a of the duplicated main jack.

When the pilot moves his lever 11 forwards, i. e. anti-clockwise as seen in Fig. 1, the transducer 80 shifts the valve 81 to the right, thereby causing the ram 82 and control valves 19, 19a to move to the left. The main rams 13, 13a accordingly move to the right to depress the elevator 10. The ram 82 carries a pick off 85 coacting with the potentiometer 76. During movement of the control surface, position feedback signals are transmitted from the potentiometer 75 and velocity feedback signals are transmitted from the potentiometer 76 to the amplifier 78. When the control surface has reached the position selected by the pilot, the first stage ram 82 and therefore the control valves 19, 19a are returned to the neutral position shown by the transducer 80. As will be obvious, a similar sequence of events takes place when the pilot moves his lever rearwardly, the first stage control valve 81 being then moved to the left to cause the control surface 10 to rise. While the servomotor is under electrical control, an autostabilizer 186 is effective on the amplifier 78 to impart corrections to the position of the control surface.

As shown in Figs. 3 and 4, the transducer 80 comprises an armature 87 mounted on a shaft 88 carrying an arm 89 connected to the control valve 81. The armature 87 moves between pole pieces 90 surrounded by a coil 91 through which the signals from the amplifier 78 are passed.

In the event of an electrical failure, or a hydraulic failure occasioned by seizure of the first stage control valve 81, the first stage ram 82 will run away and open either a forward sign sensing switch 92 or a rear sign sensing switch 92a, according as to whether the pilot has moved his lever 11 forwards or rearward. When the switch 92 is opened, the control surface 10 will move down, rocking the link 44 about its intermediate pivot point 93 and shifting the control rod 42 to the left. The link 40 will accordingly be rocked clockwise about its upper end, which is maintained stationary by the feel simulator, to actuate a tappet 94a and to open a rear overload sensing switch 95a.

As will be apparent from Fig. 2, opening of the contacts 92 and 95a will break the holding circuit to the relay 54 and to the solenoids 55, 56, 56a. The system thus reverts automatically to mechanical control. De-energization of the relay 54 opens the switch 542 to disconnect the potentiometers 74, 75, 76 from the supply. De-energization of the solenoids 56, 56a engages the lock 47 as already explained. De-energization of the solenoid 55, also as already explained, moves the differential link 24 to its downward position. It is then disconnected from the first stage ram 82, since the pin 83 is now accommodated in the wide part of the slot 84. The pilot can accordingly control the second stage servo-motor by rocking the link 24 about its lower end through the control rod 42, the link 24 acting as a follow up link to restore the control valves 19, 19a to their neutral position when the control surface has reached the position selected by the pilot.

If failure occurs when the pilot has moved his lever 11 rearwardly, the ram 82 will open the rearward sign sensing switches 92a, and the resultant upward movement of the control surface 10 will cause the control rod 42 to swing the link 40 anti-clockwise to actuate a tappet 94 to open a forward overload sensing switch 95. As will be clear from Fig. 2, this will break the holding circuit to the relay 54 and solenoids 55, 56 and 56a and cause reversion to mechanical control.

The mechanical linkage thus acts as a reference against which the electrical link is continuously checked, an emergency system being automatically engaged when the discrepancy between the two exceeds a safe amount.

When however, the overload and sign sensing switches are actuated as the result of the control surface being unable to move sufficiently, or sufficiently rapidly, in the direction selected by the pilot switches of the same sign will be opened. Thus, in the case of forward movement of the lever 11 switches 92 and 95 will be opened, while switches 92a and 95a will be opened in the case of rearward movement of the lever. As will be clear from Fig. 2, this will not break the holding circuit and reversion to mechanical control will not occur.

If, while the electrical signalling system is in operation, the pilot desires to place the servo mechanism under control of the auto-pilot he can do so by operating an on switch 96 (Fig. 2). Auto-pilot control is removed by operation of an off switch 97. When the on switch 96 is operated, and provided the switch 541 is closed to maintain the electrical signalling system in operation, a relay 98 is energised, to close a switch 981 to maintain a holding circuit for itself, to open a switch 982 to de-energize the solenoids 56, 56a, to open a switch 983 and to close a switch 984 see also (Fig. 1A). On closure of the switch 984 the auto-pilot 99 is switched in to take over control of the system through the agency of the amplifier 78 and transducer 80. As the result of de-energization of the solenoids 56, 56a the backlash lock 47 is engaged and the pilot's lever 11 is moved by the control rod 42 in unison with the control surface. The auto-pilot 99 sends signals, via a low pass filter 100 to a trim relay 101, so causing a trim motor 102 to rock the plate 34 about its pivot 26 to straighten the linkage 28, 30, signals being fed back from a potentiometer 103 carried by the plate 34 to the relay 101 to terminate the operation of the trim motor 102 when the linkage has straightened.

In the event of failure when the system is under auto-pilot control, the control surface 10 will, since movement of the control rod 42 is desisted by the feel simulator, displace the upper end 46 of the differential link from abutment with the fulcrum 70. This will rock the bell crank 65 and so open the switch 68. Since the switch 983 (Fig. 2) is now open, this will break the holding circuit and cause reversion to mechanical control as already explained.

If the change over system should fail to respond to a failure of the electrical system, the pilot can actuate an emergency cock 104 thereby connecting the cylinders 59, 59a and 62 to an exhaust outlet 105, and causing the lock 47 to engage and the differential link 24 to move down to the position appropriate for mechanical operation of the servo system.

If desired, provision may be made for automatic de-energization of the solenoid 56 when a given Mach number is attained, thereby allowing its piston 48 to move up to reduce the backlash in the mechanical linkage.

It is desirable that the inlets 20 and 58 should be connected to a common supply. Reversion from electrical to manual control will then be automatic in the event of failure of the hydraulic supply pressure, since the piston 63 will then be moved to the left by its spring 64 to shift the differential link 24 to its alternative position as already explained.

What I claim as my invention and desire to secure by Letters Patent is:

1. A power operated flying control system for aircraft comprising a pilot's control member, a control surface, a hydraulic servo motor comprising an input member and an output member, said output member being coupled to said control surface, an electro-hydraulic actuator having an input member and an output member, means for connecting the output member of the electro-hydraulic actuator to the input member of the hydraulic servo motor, an electrical signalling system operable by said control member to impart movement to the input member of said actuator and thereby to move the control surface to positions selected by the control member, means for switching the electrical signalling system into and out of operation, a mechanical linkage for actuating the input member of said servo motor, a lock for coupling said linkage to said control member, lock controlling means controlled by said switching means for engaging said lock when said electrical signalling system is out of operation and disengaging said lock when said electrical signalling system is in operation, a first electrical switch mechanism comprising a pair of switches which are arranged to be selectively operated by relative movement in opposite directions of said control member and said linkage, a second electrical switch mechanism comprising a pair of switches which are arranged to be selectively operated by movement in opposite directions of the output member of the electro-hydraulic actuator, and changeover mechanism operable by said switch mechanisms when said electrical signalling system is in operation and in the event of runaway of said actuator and to disable said electrical signalling system and thereby cause said lock controlling means to engage said lock, said change over mechanism being unresponsive to actuation of said switch mechanisms as the result of insufficient movement of the control surface in the direction selected by the control member.

2. A flying control system as claimed in claim 1, wherein said linkage is connected to move in unision with said control surface and to operate said first switch mechanism in the event of a predetermined discrepancy between the positions of the control member and of the control surface.

3. A flying control system as claimed in claim 2, comprising an auto pilot, switch means operable to render said auto pilot effective to control through the electrical signalling system the position of the input member of said actuator and means responsive to operation of said switch means for engaging said lock.

4. A power operated flying control system for aircraft comprising a pilot's control member, a control surface, a hydraulic servo motor comprising an input member and an output member, said output member being coupled to said control surface, an electro-hydraulic actuator having an input member and an output member, means for connecting the output member of the electro-hydraulic actuator to the input member of the hydraulic servo motor, an electrical signalling system operable by said control member to impart movement to the input member of said actuator and thereby to move the control surface to positions selected by the control member, means for switching the electrical signalling system into and out of operation, a mechanical linkage for actuating the input member of said servo motor, a second mechanical linkage connected to said control member, a lock for coupling said linkages together, means controlled by said switching means for engaging said lock when said electrical signalling system is out of operation and disengaging said lock when said electrical signalling system is in operation, a first switch mechanism comprising two switches between which said second linkage is movable with backlash when said lock is disengaged, said switches being selectively actuable by movement in opposite directions to a predetermined extent of said second linkage, a second switch mechanism comprising two switches which are selectively operable by movement in opposite directions of the output member of said actuator, and changeover mechanism operable by said switch mechanism when said electrical signalling system is in operation and in the event of runaway of said actuator to engage said lock and to disable said electrical signalling system, said change over mechanism being unresponsive to actuation of said switch mechanisms as the result of insufficient movement of the control surface in the direction selected by the control member.

5. A power operated flying control system for aircraft comprising a pilot's control member, a control surface, a hydraulic servo motor comprising an input member and an output member, said output member being coupled to said control surface, an electro-hydraulic actuator having an input member and an output member, an electrical signalling system operable by said control member to impart movement to the input member of said actuator, a mechanical linkage for actuating the input member of said servo motor, a differential link movable from a first position in which it connects the input member of the servo motor to the output member of the actuator to a second position in which it connects said input member to said mechanical linkage, a lock for coupling said linkage to said input member, means for switching the electrical signalling system into and out of operation, lock controlling means controlled by said switching means for engaging said lock when said electrical signalling system is out of operation and disengaging said lock when said electrical signalling system is in operation, link controlling means controlled by said switching mechanism for moving said differential link to its first position when said electrical signalling system is in operation and to its second position when said electrical signalling system is out of operation, a first electrical switch mechanism comprising a pair of switches which are arranged to be selectively operated by relative movement in opposite directions of said control member and said linkage, a second electrical switch mechanism comprising a pair of switches which are arranged to be selectively operated by movement in opposite directions of the output member of the electro-hydraulic actuator, and changeover mechanism operable by said switch mechanisms when said electrical signalling system is in operation and in the event of runaway of said actuator to disconnect the electrical signalling system from a source of electrical supply and thereby cause said lock controlling means to engage said lock and said link controlling means to move said differential link to the second position, said changeover mechanism being unresponsive to actuation of said switch mechanisms as the result of insufficient movement of the control surface in the direction selected by the control member.

6. A flying control system as claimed in claim 5, comprising an auto pilot, switch means operable to render said auto pilot effective to control through the electrical signalling system the position of the input member of said actuator, means responsive to operation of said switch for engaging said lock, an auto pilot hold-in switch associated with said differential link and arranged to be operated, on movement of said differential link to its second position while said auto pilot is effective, to disable said electrical signalling system.

7. A power operated flying control system for aircraft comprising a two-stage hydraulic servo motor, each stage of which has an input member and an output member, an electro-mechanical transducer for actuating the input member of the first stage, a pilot's control member, an electrical signalling system operable by said control member to transmit signals to said transducer, a control surface connected to the output member of the second stage and movable thereby to positions selected by the control member, a mechanical linkage operable by said control member, means for switching the electrical signalling system into and out of operation, a differential link connected to the input member of the second stage, and means controlled by said switching mechanism for automatically shifting said differential link to and from a first position, occupied by said link when said signalling system is in operation, to a second position, occupied by said link when said signalling system is out of operation, said link when in its first position being connected to the output member of the first stage and pivoting about a first fulcrum to impart movement to the input member of he second stage under control of said output member and, when in its second position, being disconnected from said output member and pivoting about a second fulcrum to impart movement to the input member of the second stage under control of said mechanical linkage.

8. A flying control system as claimed in claim 7, wherein opposite ends of the differential link coact with said first and second fulcra and comprising a pin and slot connection between the differential link and the output member of the first stage which is effective to rock said differential link only when said link is in its first position.

9. A flying control system as claimed in claim 8, comprising a link connecting the mechanical linkage to the end of the differential link which pivots about the second fulcrum.

10. A flying control system as claimed in claim 7, comprising a biased servo piston for controlling the position of the differential link, a valve for controlling communication between the servo piston, a source of fluid pressure and exhaust, and a relay associated with the electrical signalling system for controlling the position of said valve.

References Cited in the file of this patent

UNITED STATES PATENTS

| | | |
|---|---|---|
| 2,673,314 | McCallum | Mar. 23, 1954 |
| 2,678,177 | Chenery et al. | May 11, 1954 |
| 2,683,004 | Alderson et al. | July 6, 1954 |
| 2,731,217 | Noxon | Jan. 17, 1956 |

FOREIGN PATENTS

| | | |
|---|---|---|
| 679,229 | Great Britain | Sept. 17, 1952 |